Feb. 6, 1962 W. M. MEEKER 3,019,773
FLUID MOTOR
Filed Oct. 8, 1959 2 Sheets-Sheet 1
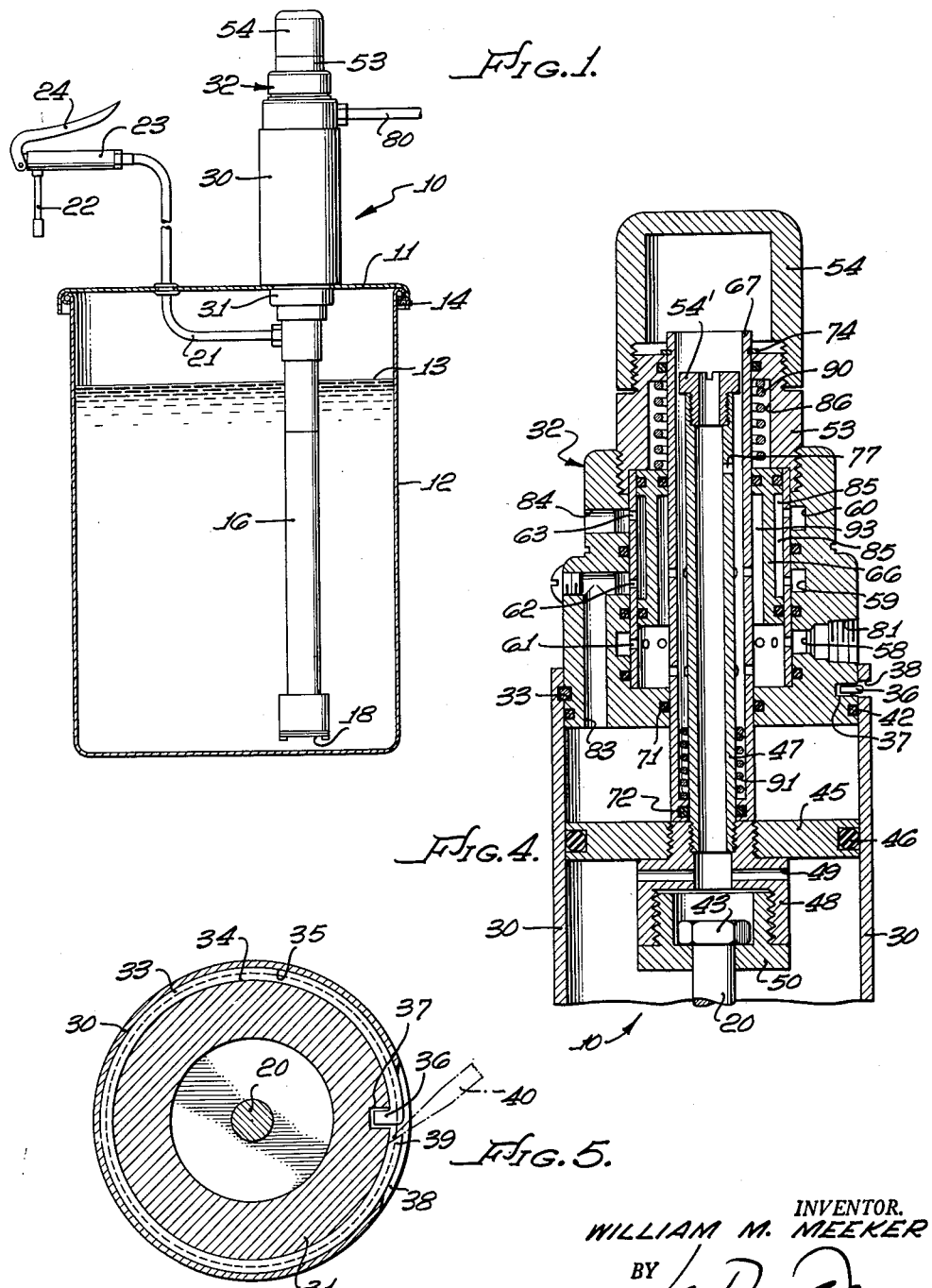
INVENTOR.
WILLIAM M. MEEKER
BY
ATTORNEY.

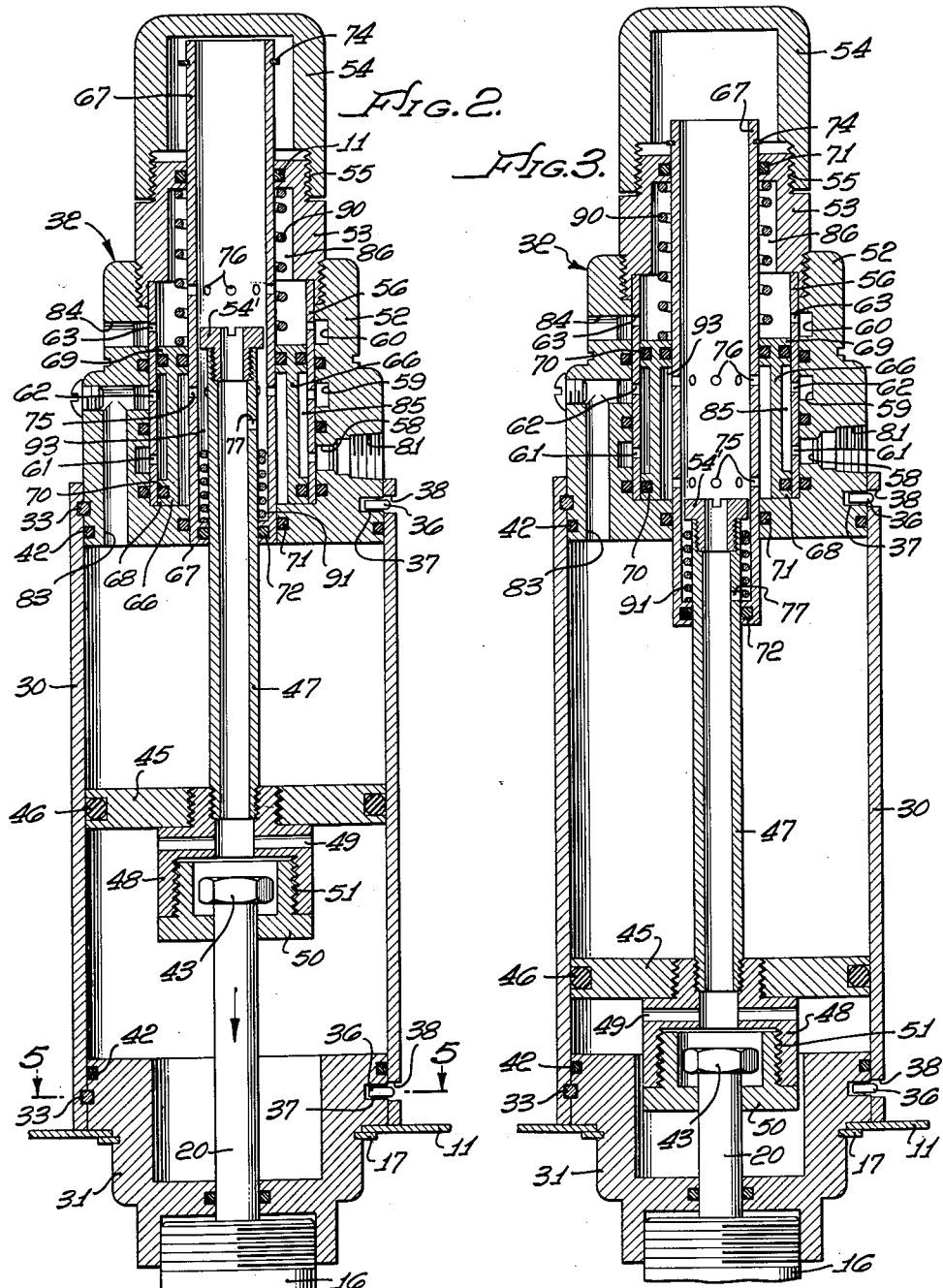

United States Patent Office 3,019,773
Patented Feb. 6, 1962

3,019,773
FLUID MOTOR
William M. Meeker, Pasadena, Calif., assignor to Grover Smith Manufacturing Corporation, San Gabriel, Calif., a corporation of California
Filed Oct. 8, 1959, Ser. No. 845,217
16 Claims. (Cl. 121—157)

This invention relates to self-reversing fluid motors and more particularly to a double action type fluid motor of unusually rugged design featuring but three moving parts and further characterized by the provision of means for cutting off the escape of spent fluid as the motor approaches one end of its stroke in order that the continued movement of the piston will compress the trapped fluid for use in shifting the reversing valve to its alternate position.

Self-reversing fluid motors of the reciprocating type have been utilized for many years in many different operating environments and particularly for the transfer of material from one place to another. For example, such motors are widely used today to transfer oil and grease from a storage container and to deliver it under pressure to mechanism requiring lubrication. A source of pressurized fluid such as tire inflating air available at all garages and service stations provides a convenient and readily available power source. The fluid motors of the type referred to include self-reversing valve mechanism of many different designs for reversing the flow of the pressurized air through the parts of the motor to drive the same to-and-fro in a reciprocable movement to pump lubricant from a container. However, such motors as heretofore designed are subject to numerous shortcomings and disadvantages sought to be obviated by the present invention. For example, the parts of the reversing valve mechanism of prior constructions are unduly complicated, numerous, and dependent on many very close manufacturing tolerances. It is also necessary to provide fluid seals between the relatively moving surfaces and these are subject to wear, deterioration, and entail variable and serious frictional loads. Furthermore, these prior valve designs are subject to malfunctioning and non-functioning due to stickiness between the parts, sensitivity to temperature changes and to the presence of foreign particles between the working parts and require frequent servicing by carefully trained personnel. A particularly serious shortcoming of prior designs is the lack of adequate power to effect the positive reversal of the valve parts with the result that stoppage occurs near the end of a piston stroke.

The fluid motor provided by the present invention obviates the foregoing and other serious disadvantages of other prior fluid motors. The number of moving parts in the motor is reduced to a minimum of three and these are designed to move coaxially of one another. The three moving parts include the piston, the flow reversing valve and an actuating member. The latter has a lost motion connection with the piston and is operable thereby as the piston approaches either end of its stroke to activate power means for reversing the position of the reversing valve and thereby the flow of fluids to the cylinder.

A particular feature of the new design is an arrangement of the valve parts whereby the exhaust of spent fluid is cut off as the piston approaches one end of its stroke with the result that continued movement of the piston is effective to compress the trapped fluid for use in moving the reversing valve to its alternate position. Any tendency of the reversing valve to stick is counteracted by the associated increased pressurization of the trapped fluid until it positively overcomes the resistance to movement of the reversing valve. During the ensuing reverse movement of the piston, the reversing valve actuator is moved by the piston to a position to divert a portion of the pressurized fluid from the supply line to a chamber wherein this pressure aided by the action of a spring is effective to move the reversing valve to its opposite extreme position. It can therefore be said that this spring supplements the supply line pressure in returning the reversing valve to its initial position. It should also be noted that the diversion of the fluid also serves to slow the movement of the piston as the latter approaches the end of its stroke.

Accordingly, it is a primary object of the present invention to provide an improved and simplified self-reversing double action reciprocable fluid motor characterized by its simplicity, reliability, low cost, ease of assembly and disassembly, effectiveness and high efficiency.

Another object of the invention is the provision of a simplified, self-acting, reversing motor having but three relatively moving parts arranged concentrically of one another for axial movement relative to a common axis.

Another object of the invention is the provision of a double action fluid motor delivering substantially the same power output and operating at substantially the same speed in both directions, and further characterized in its ability to resume operation irrespective of the position in which it stops.

Another object of the invention is the provision of a self-acting, reversing fluid motor having pressure operated reversing valve mechanism operable to reverse the flow of pressurized fluid to the motor by the pressure of trapped fluid which fluid is placed under pressure as the motor approaches one end of its operating stroke.

Another object of the invention is the provision of a self-reversing fluid motor utilizing the main line supply pressure to effect reversal of the valve mechanism at one end of the motor stroke and for compressing trapped fluid within one end of the motor to return the valve parts to their original position as the motor approaches the other end of its stroke.

Another object of the invention is the provision of an improved and simplified fluid motor all parts of which may be assembled and disassembled by the use of the simplest of tools such as a screwdriver.

These and other more specific objects will appear upon reading the following specification and claims and upon considering in connection therewith the attached drawings to which they relate.

Referring now to the drawings in which a preferred embodiment of the invention is illustrated:

FIGURE 1 is a vertical elevational view partly in section of the motor of this invention assembled to a lubricant pump and mounted in the cover of a lubricant container;

FIGURE 2 is a longitudinal sectional view through the motor showing the position of parts during downward movement of the piston;

FIGURE 3 is a view similar to FIGURE 2 but showing the piston approaching its normal lower position and compressing trapped fluid within the lower end of the cylinder for use in shifting the reversing valve to its alternate position;

FIGURE 4 is a fragmentary view similar to FIGURES 2 and 3 showing the piston approaching the upper end of its stroke; and FIGURE 5 is a cross-sectional view taken along line 5—5 on FIGURE 2 showing the retainer employed in holding components of the motor assembled.

Referring first to FIGURE 1, there is shown a preferred embodiment designated generally 10 of the fluid motor incorporating the present invention. This motor is held clamped to the cover 11 of a drum 12 filled with lubricant 13, the cover 11 being clamped to the curled rim of the drum as by screws 14. The lubricant pump 16 is secured to cover 11 by a split ring keeper 17 (FIGURE 2) and may be of any well known form having an inlet end 18 spaced close to the drum bottom. It will be understood that reciprocation of piston or pump rod 20 (FIGURE 2) by motor 10 is effective to draw lubricant into inlet 18 and to trap it behind suitable check valves after which the next downward stroke of pump rod 20 is effective to force the trapped lubricant through holes 21 and outwardly through outlet tube 22 of dispensing assembly 23 under the control of a pivoting operating handle 24 in accordance with common practice well known to those skilled in pressurized lubricating devices. Although the motor of this invention is herein shown as operating a lubricant pump, it will be understood that the motor has a great variety of uses. For example, it has general application in the transfer of liquids and semi-liquids generally from containers into processing vats and the like as well as in the supply of pigments and chemicals to spray nozzles and other dispensing devices.

Motor 10 includes a main tubular shell or cylinder 30 closed at its lower end by an end cap 31 and having secured to its upper end the reversing valve mechanism 32. The peripheral walls of end cap 31 and of valve mechanism 32 telescope into the opposite ends of cylinder 30 in the manner best shown in FIGURE 2 and are detachably held assembled thereto by separate retaining rings 33 having the configuration best shown in FIGURE 5. Thus, cylinder 30 and cooperating end fittings are each provided with facing annular grooves 34, 35, the combined depths of which are just sufficient to receive retainer 33. The latter has a hooked end 36 receivable in an opening 37 of the end cap structures.

Cylinder 30 is provided with a long slot 38 opening into groove 35 and when the parts are properly assembled for grooves 34 and 35 to mate, hooked end 36 of retainer 33 is seated in well 37 following which end cap 31 and cylinder 30 are relatively rotated to feed the ring into grooves 34 and 35. Once the retainer has been fully assembled within grooves 34, 35, cylinder 30 can be rotated to position slot 38 out of registry with the ends 36 and 39 of the retainer.

Disassembly is accomplished by rotating cylinder 30 to position slot 38 opposite the ends of the retainer after which a sharp tool, such as a screwdriver 40, can be inserted between the ends of the retainer and in a manner to guide end 39 outwardly through slot 38. It is also pointed out that the couplings for each of the end cap structures are provided with a suitable seal such as an O-ring 42.

Slidably supported within cylinder 30 is a piston 45 having a groove in its periphery seating an O-ring gasket 46. Threaded within a central opening through piston 45 is an open-end tube 47 having its outer end extending centrally into the hollow interior of valve mechanism 32. The lower end of the tube is threaded into a fitting 48 having radial passages 49 opening into the lower end of cylinder 30. A lost motion connection between pump rod 20 and piston 45 is provided by a bushing 50 having a threaded connection 51 with a well opening axially into fitting 48. The upper headed end 43 of pump rod 20 has limited axial movement between the bottom of this well and the lower end of bushing 50 as is made clear by FIGURE 2. Threadedly secured to the upper end of tube 47 is a bushing 54′, the rim of which extends slightly beyond the outer side wall of the tube for a purpose which will be explained presently.

Valve mechanism 32 has a generally tubular main body 52 threadedly seating at its outer end a sleeve 53 normally sealed closed by a cap 54 threaded to the top of sleeve 53 by threads 55. Sleeve 53 serves as a retainer for a thin-walled, accurately machined sleeve 56 having a snug fit against the inner wall of main body 52. Sleeve 56 overlies and forms a closure for three inwardly opening annular fluid distributing grooves 58, 59 and 60, there being a plurality of small diameter perforations 61, 62 and 63 opening through this sleeve from respective ones of the annular grooves 58, 59 and 60.

Controlling the flow of fluid through openings 61, 62 and 63 is a spool-like reversing valve 66 and an open-ended tubular actuating valve 67, these valves being concentric with one another and with tube 47 secured to piston 45. Reversing valve 66 has gasket carrying flanges 68, 69 at its opposite ends, flange 69 projecting radially in opposite directions from the main body of the valve and each flange seating a sealing gasket or O-ring 70 cooperating with the adjacent wall structure to provide a fluid-tight type seal.

Actuating valve 67 has a length substantially co-extensive with the hollow interior of the valve mechanism 32 and is slidably supported by inwardly projecting flanges at the lower end of valve body 52 and at the upper end of threaded sleeve 53, each of these flanges being provided with an O-ring seal 71. Additionally, the lower end of the actuating valve has an inwardly projecting flange provided with an O-ring seal 72 sealing against the exterior of tube 47 of the piston assembly. It is further pointed out that the upper end of actuating valve 67 is provided with a stop, such as the split spring keeper 74, which projects beyond the outer side wall of the valve and engages the upper end of threaded sleeve 53 to limit the downward movement of valve 67. Normally, however, valve member 67 does not move downwardly beyond the position shown in FIGURE 3, and stop ring 74 does not come into play. This is because conditions normally prevailing within the valve mechanism are such that the reversing valve is shifted to change the direction of movement of the piston by the time valve 67 has moved downwardly to the position shown in FIGURE 3.

To be noted in particular from FIGURE 3 is the fact that actuating valve 67 has two annular rows of perforations 75 and 76. The upper end of tube 47 also has a single perforation 77, the purpose of which is important on the rare occasions when operation of the motor is discontinued in one particular position of the parts and then allowed to remain idle sufficiently long for the pressure of the compressed fluid in the lower end of the cylinder to dissipate. As will be explained in detail later, perforation 77 performs an emergency function in these circumstances in that it assures resumption of the motor operation speedily and positively.

The supply of pressurized fluid to the motor is accomplished from any simple source by the aid of the flexible hose 80 which opens into the lower end of valve mechanism 32 as by way of threaded bore 81, the inner end of this bore opening into the lowermost annular fluid distributing groove 58. The intermediate annular groove 59 opens into an L-shaped passage 83 extending downwardly into the upper end of the motor cylinder 30. The uppermost annular groove 60 opens into a bore 84 located in the side wall of valve body 52. If liquid is being used to operate the motor, as frequently is the case, outlet bore 84 may be connected with a hose or other conduit means leading to the fluid reservoir from which the fluid is later drawn under pressure as required for return under pressure through hose 80 and inlet opening 81.

The operation of the described motor will now be outlined, it being assumed that the motor is assembled in the manner shown in FIGURE 1 and that pressurized air is being supplied to the motor through hose 80. As the operator depresses handle 24 of the grease dispensing device 23 to dispense grease into a fitting for parts to be lubricated, air under pressure within lower distributing groove (FIGURE 2) passes through openings 61 into chamber 85 and through ports 62 into groove 59. The pressurized air then flows into L-shaped passage 83 leading into the top of cylinder 30.

The air within the lower chamber of cylinder 30 escapes through passages 49, tube 47 into the upper end of actuating valve 67. The air flows from this valve through ports 76 opening into chamber 86 and escapes from there through ports 63, groove 60 and outlet port 84 to the atmosphere. Hence, it is clear that the pressure within the lower end of the motor is substantially atmospheric during this phase of the operation.

It is therefore seen that the upper side of piston 45 is exposed to the high pressure fluid, whereas the lower side of this piston is in communication with the atmosphere through the path just described. High pressure fluid within chamber 85 does not tend to move the reversing valve 66 because the high pressure is equally effective on the flanges at the opposite ends of this valve and for this reason the stiff spring 90 surrounding the actuating valve 67 and bearing against the top of the reversing valve is effective to hold valve 66 seated at the lower end of chamber 86 as is clearly illustrated in FIGURE 2.

Accordingly, the high pressure fluid is effective during this period to force piston 45 downwardly and to carry therewith the pump actuator rod 20. The downward movement of rod 20 is effective in a manner well known to those familiar with this art to force lubricant trapped within the barrel of pump 16 outwardly through hose 21 and dispensing tube 22 while at the same time trapping a further quantity of lubricant within the lower end of the pump, it being understood that pump 16 operates to discharge lubricant under pressure irrespective of the direction of movement of piston 45 in cylinder 30. Pumps and driving motors therefor operable to discharge fluent material irrespective of the direction of reciprocation are known as double action pumps and double action motors, this term being used to distinguish them from so-called single action motors which are effective to discharge fluent material only when reciprocating in one direction but not during the return stroke in the opposite direction.

As piston 45 continues downward carrying tube 47 therewith, it will be apparent that the rim of bushing 54' at the upper end of tube 47 will eventually contact the upper end of a rather stiff coil spring 91 resting against the inturned radial flange at the lower end of actuator valve 67. In consequence, continued downward movement of tube 47 will be effective through spring 91 to move actuator valve 67 along therewith. The ring of port 77 and midportion of actuator valve 67 will be carried downwardly with this tube, and the air from the lower end of cylinder 30 will continue to escape through these ports until ports 76 are cut off by the inturned flange at the upper end of reversing valve 66. Accordingly, ports 76 may be appropriately termed cut off ports for the exhaust fluid.

Once the out flow of the exhaust fluid is cut off in the manner just described, the continued downward movement of piston 45 under the influence of the high pressure on the top side of the piston will be effective to compress fluid trapped below piston 45. As the pressure increases on this trapped fluid, valve 67 will have moved downwardly sufficiently to open ports 76 into the annular chamber 93 lying between valve 67 and the inner side wall of reversing valve 66. As soon as the pressure within chamber 93 increases sufficiently to overcome spring 90 pressing downwardly against the top of reversing valve 66, reversing valve 66 will be forced upwardly until it contacts the shoulder at the lower end of sleeve 53, which is the alternate stable position of the reversing valve. As valve 66 moves upwardly, ports 61 will pass high pressure fluid into chamber 93 where it will be effective to hold the reversing valve positively in its upper position throughout the upward stroke of piston 45.

It is pointed out and emphasized that normally the reversal of valve 66 from the position shown in FIGURE 2 to the position shown in FIGURE 4 is accomplished solely in the manner just described and without exposing or opening port 77 in tube 47 to the upper end of cylinder 30. In other words, port 77 normally does not move below the position shown in FIGURE 3, nor does it open into the upper end of cylinder 30 during normal operation of the motor. Accordingly, it is impossible for the high pressure fluid within the upper end of the cylinder to flow through port 77 and into the interior of tube 47.

As reversing valve 66 approaches its alternate upper position, it will be clear that the high pressure fluid within the upper end of cylinder 30 can escape through passage 83, groove 59, ports 62 into annular chamber 85, then through ports 63 into upper groove 60 for escape to the atmosphere by way of port 84. During the flow just described, high pressure fluid from inlet 81 passes through chamber 93 and ports 75, 76 into the interior of actuating valve 67, thence downwardly through tube 47 and passages 49 into the lower chamber of cylinder 30. Accordingly, piston 45 is now forcibly moved upwardly but is allowed to move some little distance before the lost motion between head 43 of rod 20 contacts the lower end wall of bushing 50. Once this occurs, pump rod 20 is moved forcibly upward along with piston 45.

During the initial part of the upward piston movement actuating valve 67 remains in the position shown in FIGURE 3. Eventually however, the piston will contact the lower end of the actuating valve and carry it upward thereby elevating cut off ports 76 above the upper inwardly directed flange of reversing valve 66. However, the elevation of ports 76 above the upper edge of the reversing valve does not occur until the piston has closely approached the upper end of its stroke. Once ports 76 are elevated to a position of cut off, it will be clear that the rate of flow of pressurized fluid into the lower end of the cylinder will be decreased and consequently the rate of piston movement will be slowed by approximately one-half which is desirable for obvious reasons. As ports 76 emerge above the upper end of valve 66, the pressure in the upper chamber will quickly increase and cooperate with spring 90 in quickly lowering the reversing valve 66 to cut off the flow of pressurized fluid into the lower end of cylinder 30. Once valve 66 has resumed its alternate or lower position shown in FIGURE 2, the flow of pressurized fluid will be directed to the upper end of the cylinder and the piston will start moving in the opposite direction, the fluid flow then taking place through the paths first described above.

The motor continues to operate in the manner just described so long as pressurized fluid flows to the motor and so long as the dispensing device is open to allow the escape of the medium being pumped. To be noted in particular is the fact that the reversal of valve 66 is accomplished during the downward stroke of the piston by cutting off the escape of fluid below the piston and increasing the pressure in this trapped fluid to a value whereat it is effective to reverse valve 66. Reversal of the direction of piston travel in the other direction is accomplished in quite a different manner and by utilizing high pressure fluid from the supply line 80 within chamber 86, this high pressure fluid, in cooperation with spring 90, being effective on the upper end of the reversing valve to lower it quickly and positively. During its operating stroke, the motor will be understood as traveling at the same rate in both directions and as having substantially the same output irrespective of the direction of travel.

Let it be assumed that the operation of the motor is discontinued at the particular moment when piston 45 is substantially at the lower end of its normal operating stroke wherein the fluid trapped below the piston is compressed to a pressure almost sufficient to elevate reversing valve 66. Stoppage of the motor at this point for a prolonged period may result in dissipation of the pressure of the trapped fluid so that there remains inadequate pressure to reverse valve 66 upon resumed operation of the motor. Under these circumstances the high pressure fluid admitted to the upper side of piston 45 continues to move the piston downward until the stop ring 74 at the upper end of actuator valve 67 contacts the upper end of sleeve 53. Continued downward movement of piston 45 then compresses spring 91 without producing any movement of the actuator valve. Continued movement of the piston will lower port 77 and tube 47 below the actuator valve admitting the high pressure fluid from the other upper end of the cylinder into tube 47 and thence through ports 75, 76 into chamber 93. Instantly this occurs, high pressure fluid will be effective on the reversing valve 66 to elevate it in opposition to spring 90, it being pointed out that at this time chamber 86 containing spring 90 is open to the atmosphere through ports 63 and 84. Further downward movement of the piston stops and the high pressure fluid is immediately supplied downwardly through tube 47 into the lower end of cylinder 30. It will therefore be clear that port 77 serves as an emergency means for assuring the reversal of the parts under special circumstances occurring but infrequently.

While the particular fluid motor herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A fluid motor comprising a cylindrical housing reciprocably mounting a piston therewithin, automatic valve mechanism secured to one end of said housing having a pressurized fluid inlet and an exhaust fluid outlet, said piston supporting a tube opening at one end into the far end of said valve mechanism and at its other end to a chamber in said housing remote from said valve mechanism, said valve mechanism including a pair of concentric tubular sleeve valves movable independently of said piston and having open unrestricted opposite ends and slidably supported axially of said piston tube, said valve mechanism including a plurality of passages interposed between said fluid inlet and outlet and the adjacent end of said cylindrical housing and controlled by the axial movement of said piston and of said sleeve valves to direct said pressurized fluid to first one side and then to the other of said piston and for alternately exhausting fluid from the opposite ends of said cylindrical housing.

2. A double action fluid motor having a to-and-fro power stroke and operating at substantially the same speed and power in both directions, said motor comprising a closed cylinder slidably supporting a piston having an open-ended tube extending axially from one end thereof into the hollow interior of a valve housing at one end of said cylinder, an open-ended actuating sleeve valve surrounding said piston tube and slidable through a limited distance axially of said piston tube, means providing sliding sealing engagement between the inner end of said actuating valve and both said piston tube and the adjacent inner end of said valve housing, a reversing sleeve valve interposed between said actuating valve and said valve housing and cooperable therewith to direct pressurized fluid to first one end and then to the other end of said cylinder as previously supplied pressurized fluid is exhausted from the alternate ends of the cylinder.

3. A double action fluid motor having a cylinder and piston assembly operable by pressurized fluid controlled by an automatic control valve unit at one end thereof, said valve unit including a tubular housing having aligned openings at the opposite ends thereof slidably and sealingly supporting a first open-ended tube therein, a second open-ended tube supported axially within an axial opening through said piston and having its free end slidably supported concentrically within the inner end of said first tube, a third open-ended tube slidably supported between the interior of said housing and the exterior of said second tube, and fluid passage means controlled by the alternate movement of said second and third tubes in opposite directions to direct pressurized fluid supplied to said valve housing first to one end of said cylinder and then to the other as well as for alternately exhausting spent fluid from the ends of said cylinder.

4. In a double action fluid motor of the type having a valve housing secured to one end of a cylinder and piston assembly for alternately supplying pressurized fluid to the opposite ends of said cylinder to drive the piston to-and-fro at the same rate and with the same power output; that improvement wherein said valve housing includes an outer general tubular main body having at least three annular grooves spaced axially along its inner side wall, a smooth-surfaced sleeve pressed across the entrance to said grooves and having a plurality of openings into each of said grooves, an outlet passage opening from a first one of said grooves, a pressurized fluid supply passage opening into a second one of said grooves, and a fluid passage from the adjacent end of said cylinder into a third one of said grooves positioned between said first and second grooves, a spool-like sleeve valve having a close sliding fit within said first mentioned sleeve with the flanged ends thereof spaced to embrace either said first and third groove or said second and third grooves, spring means urging said sleeve valve into a position to embrace said second and third grooves, a long and relatively small diameter open-ended second sleeve valve slidably supported at its outer end concentrically within the outer end of said first mentioned sleeve valve, said piston having secured within a central opening therethrough an open-ended tube the outer free end of which has a sliding connection within the inner end of said second sleeve valve, lost motion connection means between the outer end of said piston tube and the inner end of said second sleeve valve, and means for supplying pressurized fluid to said second annular groove and selectively to the exterior or the interior of said spool-like sleeve valve for selective supply to the opposite ends of said cylinder.

5. A fluid motor as defined in claim 4 characterized in the provision of a piston rod for said piston extending from the latter through the end of said piston remote from said valve housing, and limited lost motion connection means between said piston and said piston rod.

6. A self-reversing fluid motor of the type having a cylinder and piston assembly with a reversing valve mechanism at one end thereof and having a power output connected with said piston and extending axially from the other end thereof, said valve mechanism including a flow reversing spool valve operable to direct pressurized fluid to the opposite ends of said cylinder and to provide an escape path for exhaust fluid from the alternate ends of the cylinder depending upon which of two positions said spool valve occupies, and means including a valve having lost motion connection with said piston and providing part of the flow path for fluid exhausting from one end of said cylinder and operable by movement of the piston as the same approaches the end of its stroke to cut off the flow of exhaust fluid and operable upon continued movement of the piston in the same direction to compress the trapped fluid and utilizing said compressed fluid to reverse the position of said spool valve.

7. That improvement in automatic reversing fluid motors of the type having a piston slidable along a cylinder provided at one end with a flow reversing valve for supplying pressurized fluid alternately to the opposite ends of said cylinder while exhausting fluid from the other end thereof; said improvement comprising means for supplying pressurized fluid to one end of the cylinder to move said piston to perform work while compressing fluid present in the other end from the cylinder, means for cutting off the escape of the exhaust fluid as the piston approaches the end of the stroke, and means responsive to the pressure of the compressed trapped exhaust fluid to reverse the position of said flow reversing valve.

8. That improvement defined in claim 7 characterized in the provision of a work output rod extending axially from one end of said cylinder and including a limited lost motion connection with said piston whereby said piston may move through a short distance at either end of its stroke without having to move said work output rod.

9. That improvement defined in claim 7 characterized in the provision of means for venting high pressure fluid from the working end of said cylinder into the exhaust fluid end thereof to augment the pressure in the latter if the continued movement of the piston against said exhausting fluid fails to reverse the position of said flow reversing valve.

10. A self-reversing double action fluid motor having three relatively movable parts slidably supported axially of a cylinder closed at its opposite ends, said three relatively movable parts comprising a piston assembly slidable along the interior of said cylinder, a flow reversing valve and control means actuatable automatically by said piston as the latter approaches the ends of its stroke to shift said flow reversing valve to direct pressurized fluid to the other end of said cylinder and to open an exhaust fluid port from the opposite side of said piston, said control means having a lost motion connection with said piston and being operable as the piston approaches one end of its stroke to cut off the exhaust fluid flow and to utilize the resulting increase in pressure imposed on the trapped fluid to actuate said flow reversing valve.

11. A fluid motor as defined in claim 10 characterized in that the reversal of said flow reversing valve is operable to vent fluid from the end of the cylinder which has just completed its working period of operation, and means operable as said piston approaches the end of its next stroke to slow down the flow of pressurized fluid into said cylinder, and means for utilizing a portion of the pressurized fluid following the slowing of the piston to effect the reversal of said flow reversing valve.

12. A self-reversing double action fluid motor having three moving parts operatively associated with a cylinder, said parts comprising a piston slidable lengthwise of said cylinder, a flow reversing valve and an actuating member for said reversing valve, said motor including flow passage means controlled by said reversing valve for directing pressurized fluid to first one end and then the other end of said cylinder to reciprocate said piston to-and-fro repeatedly and automatically within said cylinder, and said actuating member and said reversing valve including means for diverting a part of the pressurized fluid flowing toward one end of said cylinder for the purpose of shifting said reversing valve to effect the reversal of said piston.

13. A fluid motor as defined in claim 12 characterized in that said three moving parts include means effective as said piston approaches the end of its said reversal stroke to cut off the escape of fluid from the low pressure side of said piston to trap fluid in said cylinder and to utilize said trapped fluid to again reverse said flow reversing valve.

14. A self-reversing reciprocating fluid motor comprising a cylinder slidably supporting therein a piston and having a reversing valve mechanism supported at one end thereof and including fluid passage means for alternately supplying pressurized fluid to the opposite ends of said cylinder while alternately exhausting spent fluid from the other ends thereof, said reversing valve mechanism including means operable as said piston approaches one end of its stroke to cut off the escape of spent fluid from said one end and utilizing the pressure developed in said trapped exhaust fluid to effect reversal of said valve mechanism and of said piston.

15. A fluid motor as defined in claim 14 characterized in the provision of means in said valve mechanism operable as said reversed piston approaches the other end of its stroke to utilize the pressure of said pressurized fluid at its supply pressure to reverse said valve mechanism and the movement of said piston.

16. A self-reversing fluid motor having a cylinder slidably supporting a piston therein, automatic pressure actuated reversing valve mechanism mounted at one end of said cylinder for maintaining said piston in to-and-fro movement so long as pressurized fluid is supplied to said valve mechanism, said valve mechanism being characterized in the provision of relatively movable parts for diverting said pressurized fluid from one end to the other of said cylinder while venting spent fluid from the opposite ends of said cylinder and including means operable as said piston approaches one end of its stroke to cut off said spent fluid while said piston continues its movement and utilizing the pressure thereby imposed on said cut off exhaust fluid to actuate said valve mechanism, and said valve mechanism being further characterized in the provision of means operable as said reversed piston approaches the opposite ends of its stroke to utilize the pressure of the pressurized fluid supply to again reverse said valve mechanism and the movement of said piston.

References Cited in the file of this patent

UNITED STATES PATENTS

| | | |
|---|---|---|
| 964,866 | Jenner | July 19, 1910 |
| 1,952,690 | Strom | Mar. 27, 1934 |
| 2,698,517 | Witt | Jan. 4, 1955 |
| 2,751,889 | Mohler | June 26, 1956 |
| 2,778,343 | Crosetto et al. | Jan. 22, 1957 |
| 2,926,635 | Leonard et al. | Mar. 1, 1960 |